United States Patent [19]

Marutsuka et al.

[11] Patent Number: 5,160,452
[45] Date of Patent: Nov. 3, 1992

[54] STABLE GROUP VIII METALLIC COLLOIDAL DISPERSION

[75] Inventors: Toshinori Marutsuka; Osamu Hasegawa, both of Tokyo, Japan

[73] Assignee: Nisshinbo Industries, Inc., Tokyo, Japan

[21] Appl. No.: 362,971

[22] Filed: Jun. 8, 1989

[30] Foreign Application Priority Data

Jun. 11, 1988 [JP] Japan .................. 63-142758

[51] Int. Cl.$^5$ .................. B01J 13/00; B01J 23/40
[52] U.S. Cl. .................. 252/309; 106/1.05; 106/1.21; 106/1.11; 502/173; 502/207
[58] Field of Search ............. 252/309; 502/173, 207; 106/1.05, 1.21, 1.11

[56] References Cited

U.S. PATENT DOCUMENTS

| | | | |
|---|---|---|---|
| 3,438,805 | 4/1969 | Potrafke | 106/1.05 X |
| 3,889,017 | 6/1975 | Franz et al. | 106/1.11 X |
| 3,963,841 | 6/1976 | Anschel et al. | 106/1.11 X |
| 4,339,476 | 7/1982 | Feldstein | 106/1.11 X |
| 4,399,345 | 7/1982 | Nakao et al. | 252/309 |
| 4,551,441 | 11/1985 | Van Dijk et al. | 502/159 |
| 4,600,701 | 7/1986 | de Jongh et al. | 502/207 X |
| 4,734,299 | 3/1988 | Matusaki et al. | 106/1.11 X |
| 4,877,647 | 10/1989 | Klabunde | 252/309 X |

FOREIGN PATENT DOCUMENTS 0167326 11/1983 European Pat. Off.
2124345 6/1985 France.

Primary Examiner—Robert L. Stoll
Assistant Examiner—John M. Covert
Attorney, Agent, or Firm—Sherman and Shalloway

[57] ABSTRACT

A metallic colloidal dispersion obtained by reducing a metal of Group VIII of the Periodic Table in a mixed solvent system comprising lower alcohols and aprotic polar compounds.

10 Claims, No Drawings

STABLE GROUP VIII METALLIC COLLOIDAL DISPERSION

The present invention relates to a colloidal dispersion containing a metal of Group VIII of the Periodic Table.

Metals of Group VIII of the Periodic Table, such as Ni, Co, Rh, Pd and the like, are well known to have activity as reducing catalysts.

Raney nickel, for instance, is used as catalysts for reductive reactions, such as hydrogenation of double bond, reduction of nitrobenzene into aniline and the like. This will also hold true for Pd, Rh and the like. The present invention is designed to provide stable colloidal dispersions of these metals having catalytic activity. The colloidal dispersions of the present invention are useful, for instance, as catalysts for the hydrogenation reduction of organic compounds, and are also very highly valuable as non-electrolytic plating initiating catalysts of Cu, Ni, Co and the like.

Raney nickel is unstable in air and entails the danger of ignition upon contact with air. Because of this, more safe nickel type reducing catalysts have been studied. It is mentioned in IEC, vol. 44, No. 5, pp. 1006–1010, for instance, that finely divided $Ni_2B$ (nickel boride) obtained by reducing the salt of nickel with $NaBH_4$ in ethanol under $H_2$ stream is a strong reducing catalyst. Further, in U.S. Pat. No. 4,339,345 protective colloids, such as polyvinyl pyrrolidone, soluble nylon and the like, are disclosed as being effective for stabilizing nickel in colloidal form.

However, although it is true that these nickel type fine powders or colloids, unlike Raney nickel, are not ignitable, they are rapidly inactivated upon contact with air and water.

Because of this, they entail the defect that reducing operations must be conducted at an atmosphere from which oxygen and water are strictly removed.

On the other hand, Pd is stable to air and water and widely used as the reducing catalyst. For instance, it is widely carried out to precipitate colloidal Pd in the $PdCl_2$-$SnCl_2$ system for making it a nickel plating initiating catalyst for non-conductors. It is also proposed to reduce $PdCl_2$ in aqueous solution in the presence of a protective colloid for making it a Pd colloidal dispersion to thereby make it a nickel plating initiating catalyst. However, these Pd colloid type catalysts entail a defect that activation treatment with strong acids (such as sulfuric acid) is finally required for imparting them with catalytic activity.

The object of the present invention is to provide colloidal dispersions of metals of Group VIII of the Periodic Table having reducing catalytic activity being stable, very tractable and economically very advantageous, overcoming said problems with prior art.

The present inventors found that a very stable metallic colloidal dispersion can be obtained by reducing a salt of a metal of Group VIII of the Periodic Table, particularly of nickel, with a reducing agent, such as $NaBH_4$, $KBH_4$ and the like, in a mixed solvent system of a lower alcohol and an aprotic polar compound.

Thus, according to the present invention there is provided a metallic colloidal dispersion obtained by reducing a salt of a metal of Group VIII of the Periodic Table in a mixed solvent system comprising lower alcohols and aprotic polar compounds.

The metallic colloidal dispersion of the present invention is characterized by being stabilized even upon contact with air, free of ignitability and what is more, maintaining strong reductive catalytic functions.

In the present invention the use of the mixed solvent system is important, and when the metal salt is reduced by the use of lower alcohols alone, such as methanol and ethanol, the product obtained is immediately coagulated and precipitated and can no longer be obtained as a uniform dispersion. Moreover, the same result is obtained when reduction is carried out by the use of aprotic polar compounds alone, such as dimethylformamide (DMF).

The metallic colloidal dispersion of the present invention will be stated in more detail hereinafter.

As metal salts usable in the present invention, salts of metals of Group VIII of the Periodic Table, such as nickel, cobalt, ruthenium, rhodium, platinum, palladium and the like, may be used, and there are cited, for instance, nickel chloride-$6H_2O$, nickel acetate-$4H_2O$, nickel nitrate-$6H_2O$, cobalt chloride-$6H_2O$, cobalt acetate-$6H_2O$ and the like, and of these, one using the salt of nickel is suitable since a very stable colloidal dispersion is obtained. These metal salts are dissolved in the mixed solvent system of alcohols and aprotic polar compounds. As alcohols there are used, for instance, methanol, ethanol, propanol, isopropanol, butanol and the like, and particularly methanol, ethanol or their mixture is suitable. As aprotic polar compounds there are used, for instance, lower molecular weight ones, such as amid compounds, such as formamide, dimethylformamide, dimethylacetamide, $\alpha$-pyrrolidone, vinylpyrrolidone, N-methylformamide, polyvinyl pyrrolidone, N-methylpyrrolidone, tetramethylurea, $\epsilon$-caprolactam and the like; dimethyl sulfoxide, triphenylphosphine and the like, and of these, dimethylformamide, dimethyl sulfoxide and triphenylphosphine are suitable.

In the present invention a mixed ratio of alcohols and aprotic polar compounds in this mixed solvent system is also important to some extent. For the mixed ratio of alcohols and aprotic polar compounds the amount of aprotic polar compounds used should suitably fall generally in the range of 200 parts to 0.01 part, preferably 50 parts to 0.02 part, and more preferably 30 parts to 0.03 part, for 100 parts of alcohols in a weight ratio.

When aprotic polar compounds are used in amounts of more than 200 parts or less than 0.01 part, metals tend to be coagulated and precipitated at the time of reduction, and there is seen the tendency that it becomes difficult to obtain a stabilized colloidal dispersion. Further, the solution concentration of the metal salt in the mixed solvent system is not critical, but it can be set as falling generally in the range of 0.01 weight % to 5 weight %, preferably 0.05 weight % to 3 weight % and more preferably 0.1 weight % to 1 weight %.

In the next place, reduction is carried out by addition of a reducing agent to this metal salt-containing solution. As the reducing agent $NaBH_4$, $KBH_4$, $LiBH_4$, $(CH_3)_2NBH_3$, formaldehyde, stannous chloride, sodium hypophosphite and the like can advantageously be used, and these are added as 0.1 to 5 weight % solution of said alcohols, aprotonic polar compounds or their mixed solvent system.

For the amount of the reducing agent added it should be set as the amount corresponding to the reducing electric equivalent which is usually 0.5 to 10 times, particularly 1 to 3 times, the reduced electric equivalent of reduced metal.

For the reduction temperature it should preferably be set as falling generally in the range of about 10° C. to about 30° C., viz., a temperature of about room temperature. Stirring is not always necessary at the time of reduction reaction, but it is preferable because stirring accelerates a uniform reaction. Low speed stirring is sufficient for stirring. By these operations a very stable colloidal dispersion can be obtained in several seconds to scores of minutes.

It is not always economical, but the colloidal dispersion of the present invention can be made even under a non-oxygen atmosphere. That is, when metal salts are reduced with $NaBH_4$ and the like in the mixed solvent system of the present invention under $H_2$ stream, for instance, by shutting off air, a colloidal dispersion is obtained. This one has a strong activity, but it is unstable as colloid and it begins to coagulate and precipitate in several hours to several days, but its catalytic activity remains unchanged even after its coagulation. However, when it is stirred under contact with air, the coagulated particles are once again dispersed and it turns into a stable colloidal dispersion.

The colloidal dispersion of the present invention can also be concentrated. When the colloidal dispersion is concentrated until it reaches 1/10 volume or less at a relatively low temperature, such as about 20° to about 50° C., under reduced pressure, a slurried residue is obtained. When alcohol is once again added to this slurry, a colloidal dispersion is obtained and it is quite the same as the untreated dispersion in both catalytic activity and stability. This concentration method is very advantageous in the case of transporting the colloidal dispersion of the present invention to a remote place.

The colloidal dispersion of the present invention has excellent activity as the reducing catalyst and can be used as the non-electrolytic plating and hydrogenation catalysts. The colloidal dispersion of the present invention is very stable and tractable in air. In the case of handling in air, it is higher in activity as the non-electrolytic plating catalyst, in particular, and the one which was prepared in non-oxygen atmosphere, in particular, is higher not only in activity as the nonelectrolytic plating catalyst but also in activity as the hydrogenation catalyst. It is not necessary to use colloid protective agents which were heretofore needed for conversion to stabilized colloids. What is more, it can advantageously be carried or transported since it can be concentrated.

In the next place, the present invention will be explained in more detail by way of Examples.

EXAMPLE 1

2.5 g of nickel acetate (tetrahydrate) was dissolved in a mixed solution (497.5 g) of 100 g of dimethylformamide and 397.5 g of ethanol to make a metal salt solution (500 g). Separately 0.8 g of sodium boronhydride was dissolved in ethanol to make a reducing solution (500 g). When this reducing solution was added dropwise to said metal salt solution and stirred, it was turned to black colloidal form (metallic colloidal dispersion).

This colloidal dispersion was stable without causing coagulation and precipitation for more than 2 months in sealed air at room temperature and without causing a lowering of activity. 50 g of Kevlar® pulp was immersed in this metallic colloidal dispersion and then a surface activated product (amount of catalyst adhered 1.3 wt. %/Kevlar pulp) was obtained passing through filtration and rinsing (ethanol) steps. When this surface activated product was immersed in commercially available nickel plating solution (S680, a product of Nippon Kanigen company) at 50° C., plating proceeded with foarming occurring in 1-2 seconds.

The amount of it plated after 1 minute was 100 wt. %/Kevlar pulp. The plated product obtained can be used as electro-conductive fibers.

EXAMPLE 2

A polyester spun fabric was immersed in the same metallic colloidal dispersion as in Example 1 and it was rinsed with ethanol and then immersed in commercially available copper plating solution (made by Okuno Seiyaku company) thereby the fabric obtained gave off copper lustre from its surface.

EXAMPLE 3

The same metallic colloidal dispersion as in Example 1 was spray-coated on one side of filter pater and it was immersed in commercially available nickel plating solution thereby paper which was metallized only on one side was obtained.

EXAMPLE 4

Glass fibers (strand mat or the like) were immersed in the same metallic colloidal dispersion as in Example 1, extra colloidal dispersion was taken off by squeezing and they were directly immersed in commercially available nickel plating solution thereby they were metallized in surface.

EXAMPLE 5

2.5 g of nickel acetate and 12.5 g of E-caprolactam were dissolved in ethanol to make a metal salt solution (500 g). 500 g of the same reducing solution as prepared in Example 1 was added thereto in portions and stirred thereby a black metallic colloidal dispersion was obtained. Polyester cloth was immersed in this colloidal dispersion for 2-3 seconds, dried and then immersed in commercially available nickel plating solution thereby a good metallized surface could be obtained.

EXAMPLE 6

The same metallic colloidal dispersion as in Example 1 was spray coated on an ABS molded product (subjected only to defatting) or the ABS molded product was immersed in said dispersion thereby the resin surface swelled and after drying colloidal particles were fixed steadfast. When this surface activated product was immersed in commercially available nickel plating solution, metal having good adhesion was precipitated. With this it was made possible to improve adhesion without utilizing the usual anchor effect by etching.

EXAMPLE 7

A metallic colloidal dispersion was prepared in like manner as in Example 1 except that the same moles of nickel chloride-$6H_2O$ or cobalt chloride-$6H_2O$ or the like was used instead of nickel acetate-$4H_2O$. This dispersion was a metallic colloidal dispersion being good in stability (more than 2 months in air at room temperature) as was the case with the one of Example 1, and its activity as the plating catalyst was also of the same extent.

EXAMPLE 8

Using a dehydrated and deoxidized solvent, it was attempted to prepare a metallic colloidal dispersion by the same operations as in Example 1 at a hydrogen atmosphere. The dispersion obtained was not of complete colloidal form and its coagulation and precipitation occurred in part. It was used in dispersed suspension condition to investigate activity as the hydrogenation catalyst for olefins, in consequence of which it showed high activity.

The following is a table for comparison in activity between the system used in Examples of this invention and the protective colloid (polyvinylpyrrolidone) system.

| Olefin | DMF/EtOH system | protective colloidal system |
| --- | --- | --- |
| MMA | 0.36 | 0.42 |
| Cyclohexene | $1.8 \times 10^{-2}$ | $1.2 \times 10^{-2}$ |

(Unit [mmol $- H_2$/sec $\cdot$ g $-$ Ni])
Ni/olefin (molar ratio) 1/20

EXAMPLE 9

A metallic colloidal dispersion was prepared in like manner as in Example 5 except that 2.5 g of dimethyl sulfoxide or 0.25 g of triphenylphosphine was used instead of E-caprolactam. This dispersion was a metallic colloidal dispersion being good in stability.

What we claim is:

1. A metallic colloidal dispersion obtained by reducing a salt of a metal selected from the group consisting of nickel and cobalt, with a borohydride compound in a mixed solvent system comprising a lower alcohol and an aprotic polar compound having a weight ratio of 200 to 0.01 aprotic polar compound to 100 of lower alcohol.

2. The colloidal dispersion according to claim 1 in which the lower alcohol is methanol, ethanol or their mixture.

3. The colloidal dispersion according to claim 1 in which the aprotic polar compound is an amide compound.

4. The colloidal dispersion according to claim 1 in which the aprotic polar compound is dimethylformamide, dimethyl sulfoxide or triphenylphosphine.

5. The colloidal dispersion according to claim 1 in which the metal is Ni.

6. The colloidal dispersion according to claim 1 wherein the dispersion is prepared in a non-oxygen atmosphere, thereby enhancing the reducing catalytic properties of the colloidal dispersion.

7. The colloidal dispersion according to claim 1 wherein the dispersion is concentrated to at least 1/10 volume, thereby facilitating the transportability thereof.

8. The colloidal dispersion according to claim 1 wherein the borohydride compound is selected from the group consisting of $NaBH_4$, $KBH_4$, $LiBH_4$ and $(CH_3)_2 NBH_3$.

9. The colloidal dispersion according to claim 1 wherein the weight ratio of aprotic polar compound to alcohol is about 50 to 0.02:100.

10. The colloidal dispersion according to claim 1 wherein the concentration of metal salt in the mixed solvent system is about 0.01 weight % to about 5 weight %.

* * * * *